United States Patent [19]

Roche et al.

[11] Patent Number: 4,708,513

[45] Date of Patent: Nov. 24, 1987

[54] FATIGUE RESISTANT COUPLING FOR TUBULAR MEMBERS

[75] Inventors: Joseph R. Roche, Humble; Shaw-Wen Lin, Houston, both of Tex.

[73] Assignee: Hydril Company, Los Angeles, Calif.

[21] Appl. No.: 773,031

[22] Filed: Sep. 6, 1985

[51] Int. Cl.$^4$ ............................................. F16B 21/00
[52] U.S. Cl. ....................................... 403/361; 403/343; 403/299; 405/224; 285/356
[58] Field of Search ............... 403/343, 361, 299, 370, 403/342, 335, 338; 285/356, 353, 384, 393, 24, 18; 405/224

[56] References Cited

U.S. PATENT DOCUMENTS

| | | | |
|---|---|---|---|
| 1,756,597 | 4/1930 | Keenan | 285/356 X |
| 2,470,546 | 5/1949 | Carlson | 285/356 X |
| 3,687,495 | 8/1972 | Sakamoto et al. | 285/356 |
| 4,068,863 | 1/1978 | Lasko | 285/356 X |
| 4,124,229 | 11/1978 | Ahlstone | 285/18 |
| 4,124,230 | 11/1978 | Ahlstone | 285/18 |

FOREIGN PATENT DOCUMENTS

| | | | |
|---|---|---|---|
| A67460 | 3/1957 | France | 285/356 |
| 324865 | 5/1936 | Italy | 285/356 |
| 309543 | 2/1937 | Italy | 285/356 |

*Primary Examiner*—Cornelius J. Husar
*Assistant Examiner*—Joseph A. Fischetti
*Attorney, Agent, or Firm*—Dodge, Bush & Moseley

[57] ABSTRACT

An extended lift coupling for joining tubular members in an end-to-end relationship is disclosed. The coupling is of simple design having only three components: a pin, a box and a threaded lock ring. An external compressive axial preload places a torus on the pin in axial compression. Make-up of the lock ring maintains the compressive strain on the torus and the lock ring when the axial make-up force is removed. Thereafter, increased tensile loading on the pin and box is partially absorbed in benign compressive stress of the locking ring. By controlling the geometry of the coupling such that the stiffness of the torus is high compared to the stiffness of the box and the stiffness of the lock ring, the fatigue life of the coupling caused by applied cyclic tensile forces is enhanced.

5 Claims, 5 Drawing Figures

FATIGUE RESISTANT COUPLING FOR TUBULAR MEMBERS

BACKGROUND OF THE INVENTION

1. Field of the Invention

This invention relates broadly to the field of tubular connectors and more particularly to an extended life marine coupling for marine risers or tension leg platform tendons.

2. Description of Prior Art

As the search for hydrocarbons is extended into deeper waters, alternatives to the conventional marine platform structure for drilling and production operations have been developed. One such deep water alternative is the tension leg platform (TLP). A tension leg platform is a buoyant marine structure or work platform that is moored by a plurality of substantially vertical tendons or tethers that link a submerged anchor base and the floating platform and which are maintained in constant tension. Each tether is preferably formed by a plurality of tension legs which are preferably elongated tubular members. The tethers are disposed in an array or pattern which limits undesired platform movement to maintain the drilling and production equipment on the platform properly positioned on the water surface relative to the submerged wells.

The design requirements for tubular tension leg connectors are related to those for marine drilling and production risers, but are more critical, particularly in fatigue as the tension legs may remain in service for a decade or more. Each tubular tension leg can be formed of a plurality of mechanically end-to-end connected tubular lengths for holding the buoyed platform against undesired movement. Due to the constantly changing force loading of the tension legs resulting from wind, waves and water current, alternating stresses are encountered which induce fatigue damage of the mechanical connectors for the tubular lengths.

Due to the magnitude of the tensile load carried, the tubular tension legs normally have an outer diameter of 10–30 inches and with a relatively thick radial wall thickness. The sheer bulk of the legs provides problems in handling, manufacturing and installation of the tension legs which are formed in long lengths and coupled together. The couplings or connectors for joining the tubular tension leg lengths are subjected to the same mean and alternating force loadings as are encountered by the tension leg lengths.

Fatigue failure is affected in load transmitting tubular member connectors by two basic factors: (1) alternating tensile stresses, and (2) stress concentration points.

The prior art has shown that tensile stress, not compressive stress is usually critical to the fatigue lifetime of a tubular connection. Crack initiation and propagation, which lead to fatigue failure, occur sooner in members subjected to higher mean tensile stresses and to higher amplitude alternating tensile stresses.

The prior art has also shown that fatigue failures invariably originate at higher localized points of stress concentration.

3. Identification of Objects of the Invention

An object of the invention is to provide a tubular member mechanical coupling having an extended fatigue life.

Another object of the invention is to provide a load transmitting tubular member connector which includes members of different stiffness whereby a change in tensile load to the coupling results in a relatively low change in tension in one of the members, the other members being essentially in compression, whereby the lifetime of the coupling is increased due to the relatively small change in tension of said one member.

It is still another object of the invention to provide a load transmitting tubular member connector which includes a circumferentially continuous load carrying member having a thick section in which a portion of the alternating tension load applied to the tubular members is essentially harmlessly dissipated by cyclic compressive strain.

It is another object of the invention to provide a tubular member connector of simple design which avoids abrupt changes in geometry.

Another object of the present invention is to provide a tubular member connector of simple design with resultant economies of manufacturing.

Yet another object of the invention is to provide a tubular member connector of relatively small mass with resultant economies of operating efficiency, smaller size, easier rig handling, and cost.

SUMMARY OF THE INVENTION

This invention relates to a three-part coupling having an extended fatigue life for use in mechanically coupling tubular members in an end-to-end relationship especially adapted to couple large diameter tubular members for offshore drilling and producing rigs. The outer surface of the pin member includes a torus, the geometry of which provides it a high stiffness characteristic and which engages the box member to prevent further telescoping movement of the pin into the box. The geometry of the box provides it with a low stiffness characteristic. When an externally applied compressive preload is placed upon the pin and box, a rotatable low stiffness lock ring is threadably made-up with the box until the lock ring engages the torus.

The lock ring maintains correct preloading on the torus when the external preloading mechanism is removed. The lock ring reacts to an increase in tubular member tensile load with generally increased compressive stress. The lock ring includes a toroidal section which accepts a large percentage of increased applied tensile load with additional compressive strain.

Because fatigue failures occur sooner in like members experiencing large amplitude alternating tensile stresses, the high stiffness of the torus and the low stiffness of the ring and the box cause a change in applied tensile load to the coupling to be a relatively low tensile change in the box member with compressive stress in the lock ring, thereby reducing the likelihood of fatigue crack initiation and propagation in the coupling.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Description of the structure of the coupling and its preloading

Figure 1:
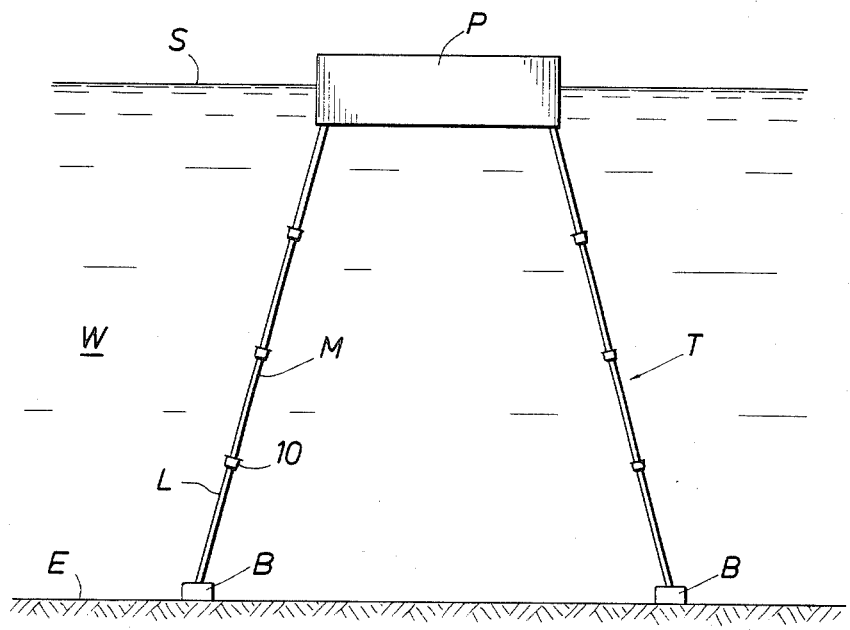
FIG. 1 is a side view in section of a tension leg platform illustrating one preferred use of the extended life coupling according to the invention.

As illustrated in FIG. 1, a tension leg buoyant work surface structure or floating platform P is located on the surface S of a body of water W. The platform P is anchored or secured to the sea floor E beneath the body of water W by a plurality of substantially vertical tendons or tethers T extending between and linking the floating platform P and a corresponding plurality of anchor bases B at sea floor E. The tethers T are arranged in a pattern for limiting the movement of the platform P to a predetermined range in order that certain operations may be conducted from the platform P.

For purposes of illustration, each tether T is represented as a single tubular member M linking the base B and the platform P. It should be understood that a plurality of tubular linking members M may be used to form each of the tethers T.

To hold the platform P in position, the tension legs T are subject to a continuous tensile loading or force. As tension leg platforms P are preferably installed in water depths of over 1,000 feet where it is relatively more practical and economical than at the shallow depths, it is desirable that each of the tubular linking members M be formed in end-to-end connected lengths L. As fatigue failure is much more likely to result from tensile stresses than compressive stresses, the lengths L and their end-to-end connectors for the various lengths L are susceptible to fatigue failure. In view of the decade or more life expectancy requirements of tethers T in a hostile marine environment, it is highly desirable to minimize the tensile stress variation in the couplings for tubular members M.

An extended life tubular coupling 10 of the present invention is illustrated in FIG. 1 operably installed in one of the tubular member M for joining lengths L in end-to-end force transmitting relationship. The coupling 10 may be installed or used in several locations in each tubular member M in one or more of the tethers T.

Figure 2:
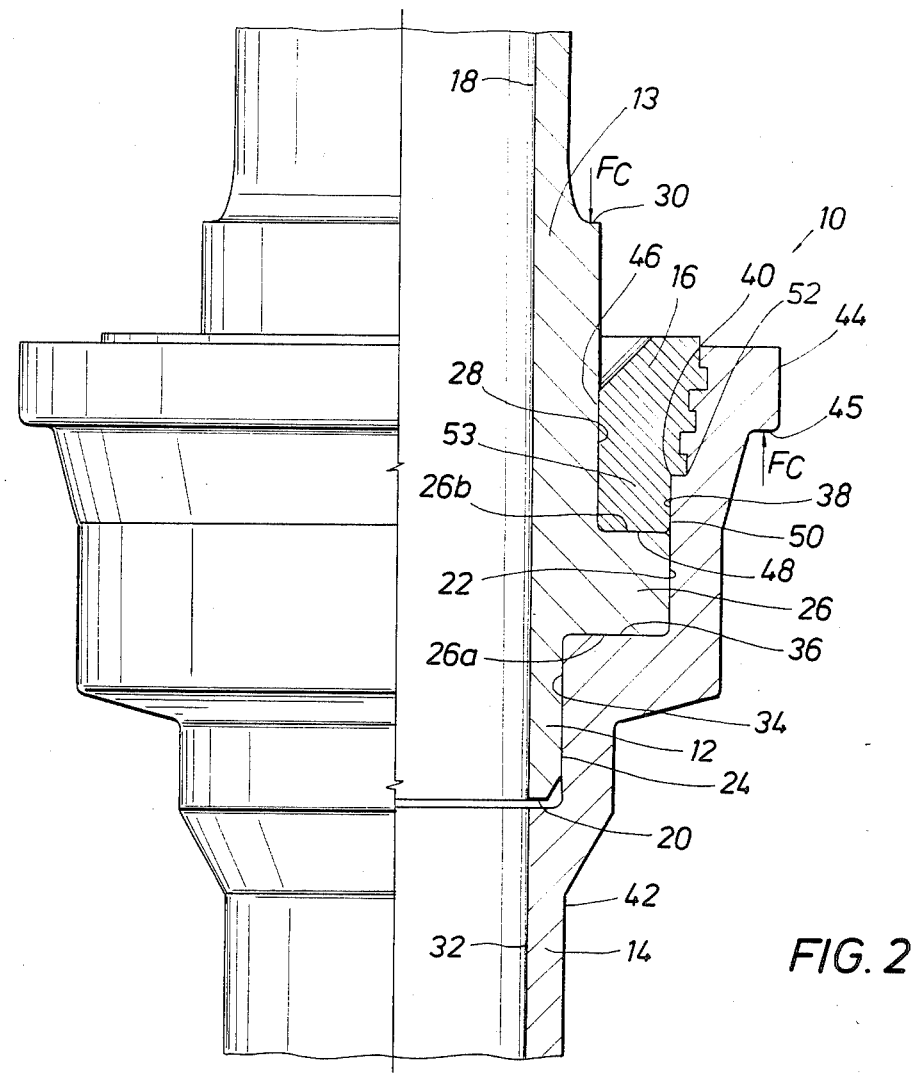
FIG. 2 is a side view, partially in section, of the extended life coupling.

As best illustrated in FIG. 2, the tubular connector 10 includes three components or parts: a pin 12, a box 14 and a lock ring 16. The tubular pin 12 has a constant diameter inner surface 18 for forming a central passage or bore. At the lower end of pin 12, the inner surface 18 terminates at the downwardly facing annular shoulder or nose 20. The nose 20 connects with an outer surface 22 having a lower constant diameter portion 24. The pin outer surface 22 further includes a torus 26 and an upper constant diameter mandrel 13. According to the invention, the torus 26 has a geometry such that its stiffness is as high as possible within, of course, the design limitations of any coupling. In other words, the ratio of the circumferential cross-sectional area $A_t$ to its effective axial length $L_t$ is as high as possible. Physically, the torus is a "short", "fat" doughnut shape.

The outer surface portion 28 of mandrel 13 terminates adjacent an upwardly facing annular shoulder 30 which is provided for applying an external force to preload the connector 10 in compression as will be explained in greater detail below.

The box 14 has an inner surface 32 forming a through bore that is co-axially aligned with the through bore 18 of the pin 12. The inner surface 32 has a larger constant diameter portion 34 that is adapted to be located adjacent the lower outer surface 24 of the pin 12 when the pin 12 is telescopically inserted into the box 14. The inner surface 32 also forms an upwardly facing angular loading shoulder 36 which is adapted to engage a downwardly facing lower angular shoulder 26a of the torus 26. Engagement of the torus shoulder 26a with the shoulder 36 blocks further telescopic movement of the pin 12 into the box 14.

Above the annular shoulder 36, the inner surface 32 forms a constant diameter portion 38 which terminates at the start of a tapered thread portion 40 of the box 14. The outer surface 42 of the box 14 has a flange 44 and a shoulder 45 formed thereon which is used in conjunction with pin shoulder 30 to preload the connector 10. Both the pin 12 and the box 14 are provided with sufficient radial wall thickness or cross-sectional area to maintain design tensile stress levels well within acceptable values. The cross-sectional shape of the box and the pin are also designed to avoid the creation of "stress raisers" which frequently result from severe changes in section thickness.

According to the invention, the box body section from surface 36 to the threaded portion 40 has a geometry to assure as low a stiffness characteristic as possible within acceptable design limits. That is, the ratio of the cross-sectional area $A_b$ of the box body section to the effective axial length $L_b$ of the box body section is designed to be low relative to the stiffness of the torus 26. In other words, the box body section is designed to be a relatively long thin member.

A lock ring 16 is provided which has a constant diameter inner surface 46 for concentrically mounting the lock ring on the pin 12 adjacent the upper constant diameter surface 28 while enabling axial and rotation movement of the locking ring 16 relative to the pin 12. The lock ring 16 forms a downwardly facing annular shoulder 48 for engaging and loading the upwardly facing shoulder 26b of the torus 26 and which acts as the lower movement stop for the lock ring 16. The lock ring 16 is provided with a toroidal section 53 between its threaded section 52 and downwardly facing shoulder 48 for accepting increases in compressive stresses when the applied tensile load increases. A constant diameter outer surface 50 of the lock ring 16 terminates adjacent threaded portion 52. The threads 52 are adapted to inter-engage or make-up with the corresponding threaded portion 40 of the box 14 in a conventional manner.

According to the invention, the lock ring 16, like the box body section, has a geometry to assure as low a stiffness characteristic as possible within acceptable design limits. That is, the ratio of the cross-sectional area $A_r$ of the lock ring to the effective axial length $L_r$ of the ring is designed to be low relative to the stiffness of the torus 26. Like the box body section, the lock ring is designed to be a relatively long thin member.

A conventional loading tool for axially preloading a connector is disclosed in U.S. Pat. No. 4,124,229, to Ahlstone which is incorporated by reference. Such external preloading apparatus employs a pair of longitudinally split rings, each of which is suitably hinged for enabling operational placement and removal from the connector 10. A plurality of hydraulically actuated cylinders connect the two rings. One ring fits concentrically about pin 12 above shoulder 30 while the other ring fits concentrically about box 14 below shoulder 45. Hydraulic pressure is increased in the plurality of cylinders for forcing the pin 12 axially into the box 14 to a desired compressive force. Such force induces compressive stress or load in the torus 26 and puts box 14 generally in tension.

The portion of the box 14 between the shoulder 36 and the flange 44 is subjected to an elongated (tension) strain by the applied force. With the compressive force applied, the lock ring 16 is rotatably made-up in the box 14 to put the ring 16 and torus 26 in compression. After visual confirmation of proper rotational make-up of the lock ring 16, the external force $F_c$ (as illustrated in FIG. 2) is released and the loading tool removed. By using an external loading tool the preloading operation is simplified (as compared to bolt and flange preloading arrangements of many prior art tubular connectors) and conducted independently of such prior art problems as bolt torque levels, bolt interaction, surface finish, or lubricity of contact surfaces, and wear of contact surfaces is essentially eliminated. The accuracy of the preload and repeatability of make-up are improved thereby increasing reliability. Simplification of the preloading operation saves rig time.

By eliminating the enormous torque required of prior art bolt and flange connectors to preload the connector 10, a significant reduction in the mass of the connector 10 is obtained. Reduction of mass of the tubular member connectors 10 provides an increased strength-to-weight ratio of the tubular member M and also reduces deck loading on the floating platform P. The uniform circumferential preloaded distribution also tends to reduce the mass requirements of the coupling 10 without the need for expensive high strength alloys for the coupling.

Figure 3:
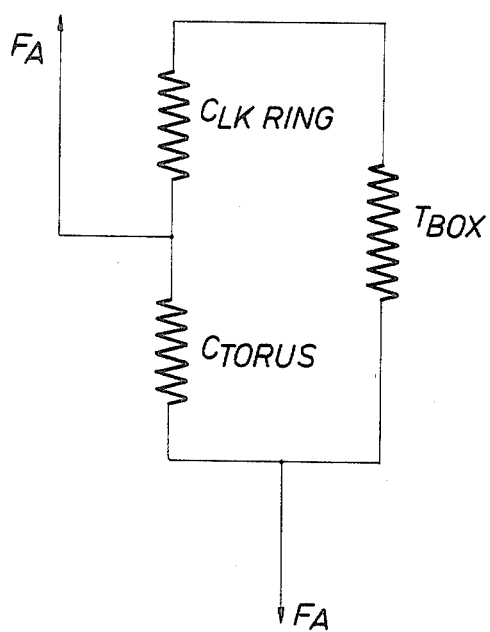
FIG. 3 is an engineering force diagram using a spring analog to illustrate the load sharing of the extended life coupling members.

FIG. 3 presents a spring analog model of the connector 10 and illustrates that the lock ring 16 is in compression, that the torus 26 is in compression, and that the box 14 is in tension because of the preload force applied to the connector. When the connector is in load transmitting service, the tensile forces applied to the connector are from the top of the torus 26 directed upwardly and from the bottom of the box 14 directed downwardly. So long as the preload force is sufficient to maintain the bottom of the torus 26 (surface 26a) in contact with annular surface 36 of box 14, the torus remains essentially in compression, as does the lock ring 16 when the entire coupling 10 is in tension $F_A$ from above and below. Because a compressively loaded member is less sensitive to fatigue crack initiation and propagation, or fatigue failure, the locking ring 16 and the torus 26 are less susceptible to possible fatigue failure. Aside from local stresses, only the box member of the three elements of the connectors is in tension.

Fatigue failure normally occurs in members subjected to large changes in amplitude of tensile stresses. The present invention harmlessly dissipates a portion of the alternating tensile stresses in cyclic compressive loading or strain. Increased tension on the leg M will decrease the compressive load on the torus 26, increase it on the lock ring 16, and will increase tensile loading on the box 14. But, the high stiffness $k_p$ of the pin torus 26, the low stiffness of the box body section $k_b$, and the low stiffness of the ring $k_r$ reduces the amplitude of change in tension in box body section in response to a change in tension of the leg M and on the coupling 10.

Fatigue fractures usually originate at highly localized points of vulnerability such as "geometric stress raisers". The simplicity of design of the coupling 10, with only three load carrying members avoids abrupt changes in geometry and wall thickness. Such design simplicity (when compared with plural bolt and flange couplings, for example) thus further enhances the fatigue life of the coupling 10.

THEORETICAL EXPLANATION OF THE INVENTION (a) Relationship of load variation in box and pin when the applied load varies.

It can be shown that when an applied load $F_A$ is applied to connection 10, (see FIG. 3 showing an analog spring diagram) the tensile force on box 14 is $$F_b = P + \left( \frac{1}{1 + k_p/k_r + k_p/k_b} \right) F_A,$$

and that the compressive force on pin torus 26 is $$F_p = P - \left( \frac{1}{1 + \frac{1}{k_p/k_r + k_p/k_b}} \right) F_A.$$

If $K_b = \dfrac{1}{1 + k_p/k_r + k_p/k_b}$, and $K_p = \dfrac{1}{1 + \dfrac{1}{k_p/k_r + K_p/k_b}}$, then, $F_b = P + K_b F_a$ (tension)

$F_p = P - K_p F_a$ (compression).

When a change in applied load $\Delta F_a$ is applied to the coupling, the change in tension in the box and the change in compression in the pin torus are $\Delta F_b = +K_b \Delta F_a$ ($\Delta$ tension in box)

$\Delta F_p = -K_p \Delta F_a$ ($\Delta$ compression in torus)

In order to minimize the magnitude of the alternating tension in the box, $\Delta F_b$, in response to a given magnitude of the alternating load, $\Delta F_a$, applied to the coupling, it is clear that $K_b$ must be minimized. Thus, the stiffness of the pin torus, $k_p$ should be as large as possible within design limits, and the stiffness of the lock ring, $k_r$, and the stiffness of the box body section, $k_b$, should be as small as possible within design limits. Maximizing $k_p$ while minimizing $k_r$ and $k_b$ will minimize $K_b$, thereby minimizing the magnitude of change in alternating tension of the box body section. Since fatigue life is relatively increased in a member having a relatively lower amplitude of cyclic tension applied to it, the coupling 10 has an increased fatigue life, as compared to similar coupling structures, where the pin torus is designed to be as stiff as possible and the box body section and the locking ring are designed to be as non-stiff (or springy) as possible within design limits.

(b) Relationship between the preload P and the make up force $F_c$.

It can be shown that, $$P = \frac{1}{1 + \frac{k_b k_p}{k_r(k_b + k_p)}} F_c$$

where
P = preload
$F_c$ = make-up force (see FIG. 2)
$k_b$ = spring constant of box 14
$k_p$ = spring constant of pin torus 26,
$k_r$ = spring constant of ring 16,
and for each member of the coupling, $$k = AE/L,$$

where
A = its cross-sectional area
L = its length
E = Young's modulus of its material.

Since it is desirable that P be as nearly as possible equal to $F_c$, it is clear that the function, $$\frac{k_b k_p}{k_r(k_b + k_p)},$$

should be as small as reasonably possible, with the restraint that $k_p$ is as large as possible and $k_b$ and $k_r$ are as small as possible. If $k_b$ is approximately equal to $k_r$, then the function is less than one and preload P is more than ½ of $F_c$.

(c) Load of Separation ($F_s$)

When the pin torus 26 loses all of its compression, that is $F_p=0$, it will separate from the box 14 (e.g., surfaces 36 and 26a will separate and the model of FIG. 3 will no longer be valid). Expressed mathematically, $$O = P - K_p F_s,$$

or $$F_s = P/K_p$$

If $F_d$ is the maximum design load of the coupling, the preload is related to the design load as, $$P \geq K_p F_d.$$

Figure 4:
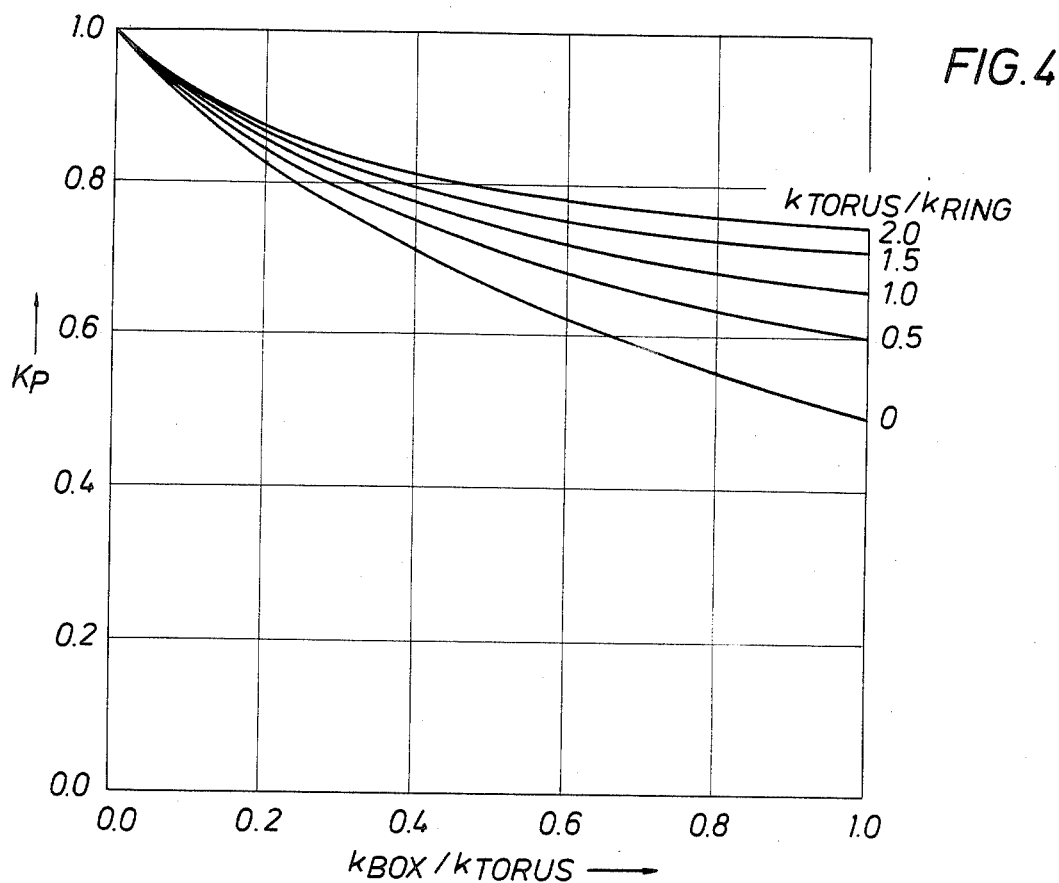
FIG. 4 is a graph illustrating $K_p$, a dimensionless proportionality constant, as a function of the ratio of the box spring constant to the torus spring constant, where the ratio of the torus spring constant to the ring spring constant is held constant for various levels.

The curves of $K_p$ in FIG. 4 show that $K_p$ is always less than one. This means that the preload can be less than the design load.

(d) Comparison of the invention with a prior art coupling

Figure 5:
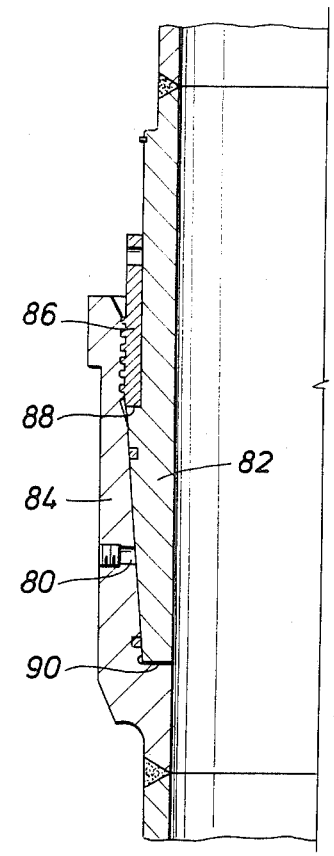
FIG. 5 is an illustration of a prior art tubular coupling.

U.S. Pat. No. 4,124,230 to Ahlstone issued Nov. 7, 1978 discloses in its FIG. 5 a prior art coupling which is reproduced for reference here as FIG. 5 (Prior Art). FIG. 5 shows a similar structure to the invention of FIG. 2, but is designed to create a "rigid connector" to enhance tensile, compressive and bending strength and to provide a fluid tight joint. A port 80 is provided to provide pressurized fluid between the pin 82 and the box 84 to expand the box 84 and compress the pin 82 radially. When the pressure is relieved, the pin 82 and the box 84 have an interference fit and have a preload applied to the pin, which is locked in by threaded sleeve 86. The Ahlstone '230 patent describes the connector as having superior tensile, compression, bending and pressure capabilities which exceed that of the pipe joined by the connector. An ideal use of the connector for marine piles and pipelines is indicated.

It is noted that the pin 82, in the shape of a torus between shoulders 88 and 90, is relatively long. Such length renders the spring constant $k_p$ of the Ahlstone torus very low when the ratio of its cross-sectional area $A_p/L_p$ is investigated. Thus the pin of Ahlstone is not stiff. Indeed the pin 82 must be "springy" in order to properly deflect when pressurized fluid is applied to port 80. Thus, while the prior art connector of FIG. 5 may be strong, it will not resist fatigue caused by cyclic changes in tension applied to the connector in that relatively high cyclic changes in tension are experienced by the box 84. As explained earlier in this description and according to the invention, having as high as possible stiffness of the torus is essential where the connector is subjected to constant cyclic tension.

(e) Relationship of the invention to Fatigue Life Factor (FLF)

According to an American Petroleum Institute (API) recommended practice RP2R (Recommended practice for design rating and testing of marine drilling riser couplings), the fatigue life factor (FLF) can be calculated by $$FLF = 0.1 \left( \frac{1 - \sigma_1/\sigma_{ult}}{(\sigma_2 - \sigma_1)/\sigma_{ult}} \right)^3, \text{ or}$$

$$FLF = 0.1 \left( \frac{\sigma_{ult}/\sigma_1 - 1}{\sigma_2/\sigma_1 - 1} \right)^3$$

where $\sigma_1$ corresponds to mean stress, and ($\sigma_2 - \sigma_1$) corresponds to stress amplitude.

API recommends that,
$L_1$ = Preload + 0.4 design load, $F_d$, for $\sigma_1$,
$L_2$ = Preload + 0.7 design load, $F_d$, for $\sigma_2$.

The ratio of $\sigma_2/\sigma_1$, which is related to alternating stress range, can be estimated as, $$\sigma_2/\sigma_1 = \frac{0.7 + (k_p/k_r + k_p/k_b)}{0.4 + (k_p/k_r + k_p/k_b)}.$$

By adjusting coupling member geometries, the coupling may be designed such that,
$k_p/k_b = 2$ (or the pin torus is twice as stiff as the box)
and
$k_p/k_r = 2$ (the pin torus is twice as stiff as the ring).
Then $\sigma_2/\sigma_1 = 1.0682$.

The small number representative of the ratio $\sigma_2/\sigma_1$ indicates that the stress fluctuation about the mean value of stress is relatively low.

The foregoing disclosure and description of the invention are illustrative and explanatory thereof, and various changes in the size, shape and materials, as well as in the details of the illustrated construction may be made without departing from the spirit of the invention.

What is claimed is:

1. A fatigue resistant coupling for connecting pipe lengths comprising,
   a pin and a box,
   said pin having a torus section formed about its outer surface which includes a downwardly facing shoulder and an upwardly facing shoulder, the circumferential cross-sectional area $A_p$ and the axial length $L_p$ of said torus being provided to produce a high ratio of $A_p/L_p$, or stiffness $k_p$, value for said torus, said box having internal threads and having a body section to receive said torus section including an inner transverse make-up shoulder confronting said downwardly facing shoulder of said torus, the circumferential cross-sectional area $A_b$ and the axial effective length $L_b$ of said box body section being provided to produce a low ratio of $A_b/L_b$, or stiffness $k_b$ value relative to said torus for said box body section, means on said pin and box engageable by a loading tool for axially relatively forcing said pin and box together and compressively loading said downwardly facing shoulder of said torus and said make-up shoulder of said box, said pin torus section and said box body section being held against separation of said shoulders with said torus in compression and said box body section in tension, and a locking ring rotatable about said pin and having external threads which are threadably engaged with said box internal threads, said ring engaging said upwardly facing shoulder of said torus for holding said torus in compression and said box body section in tension, said locking ring being in compression between said threaded engagement with said box body section and said torus, the circumferential cross-sectional area $A_r$ and the axial effective length $L_r$ of said locking ring being provided to produce a low ratio of $A_r/L_r$, or stiffness $k_r$ value relative to said torus for said locking ring section, whereby the high stiffness $k_p$ of the pin torus, the low stiffness of the box body section $k_b$, and the low stiffness of the ring $k_r$, reduce the amplitude of change in tension in said box body section in response to a change in tension applied to said pipe lengths, thereby increasing the fatigue life of said coupling.

2. An extended fatigue life coupling adapted for securing a pair of tubular members in a force transmitting relationship, comprising:

a tubular pin member having an outer surface and having a torus formed on said outer surface, said torus forming a first annular shoulder and a second annular shoulder;

a tubular box member having an inner surface with threads formed on a portion of said inner surface, said box member telescopically receiving said pin member until engagement of said inner surface with said first annular shoulder of said torus;

means on said pin and box engageable by a loading tool for applying a compression preload to said torus;

a locking ring carried adjacent said outer surface of said pin member, said lock ring having threads formed thereon for rotational make-up with said threads on said box member when said pin member is telescopically inserted into said box member, said lock ring when made-up being in compression while bearing against said second annular shoulder of said torus and maintaining said previously applied compression preload on said torus, and the geometries of said torus, box member and locking ring arranged such that the stiffness of said torus is relatively higher than the stiffness of said box member and is relatively higher than the stiffness of said locking ring.

3. An extended fatigue life coupling adapted for securing a pair of tubular members in a force transmitting relationship, comprising:

a tubular pin member having an outer surface and having a torus formed on said outer surface, said torus forming a first annular shoulder and a second annular shoulder;

a tubular box member having an inner surface with threads formed on a portion of said inner surface, said box member telescopically receiving said pin member until engagement of said inner surface with said first annular shoulder of said torus;

a locking ring carried adjacent said outer surface of said pin member, said lock ring having threads formed thereon for rotational make-up with said threads on said box member when said pin member is telescopically inserted into said box member, said lock ring when made-up being in compression while bearing against said second annular shoulder of said torus and maintaining a previously applied compression preload on said torus, and the geometries of said torus, box member and locking ring arranged such that the stiffness of said torus is relatively higher than the stiffness of said box member and is relatively higher than the stiffness of said locking ring, wherein said preload P is related to the coupling design load $F_d$ through the relation, $$P \geq K_p F_d,$$

$$\text{where } K_p = \cfrac{1}{1 + \cfrac{1}{k_p/k_r + k_p/k_b}}$$

where
$k_p$ = spring constant of said pin torus,
$k_r$ = spring constant of said lock ring,
$k_b$ = spring constant of said box member,
and for each member of the coupling, $$k = AE/L$$

where
A = its cross-sectional area,
L = its length, and
E = Young's modulus of its material,
whereby said torus remains in compression up to a design load being applied to said coupling, and whereby said torus does not separate from said box.

4. The coupling of claim 2, wherein:
the geometries of the torus and box are controlled so that the design spring constant of the torus is substantially twice that of the spring constant of the box, and the design spring constant of the torus is substantially twice that of the spring constant of the locking ring.

5. A coupling for connecting tubular members comprising:

a pin member having a torus formed about its outer surface, said torus having a bottom annular surface and a top annular surface, said torus having a circumferential area, A, and an axial length L, said area A and length L being selected to produce a high ratio A/L corresponding to a high stiffness characteristic for said torus, a box member having a low stiffness characteristic relative to said torus and having an upwardly facing annular surface engaged with said bottom annular surface of said torus, said box having thread means on its inner surface, means on said pin and box engageable by a loading tool for applying a compression preload to said torus and a tension preload to said box member;

a lock ring having a low stiffness characteristic relative to said torus and having thread means on its outer surface for engaging said thread means of said box, said lock ring having a lower annular surface means for engaging said torus top annular surface, whereby after said torus is compressed and said box member is placed in tension by an external make-up force, said lock ring is made up by threaded engagement with said box and said lock ring is placed in compression while maintaining the compression of said torus, whereby when a change in tension load is applied to said coupling, the change in tension applied to said box member is relatively reduced where the stiffness of said torus is as high as possible and the stiffness of said lock ring and said box member is as low as possible, thereby increasing the fatigue life of said coupling subjected to alternating tensile loads.

* * * * *